United States Patent [19]
Daoud

[11] Patent Number: 6,035,032
[45] Date of Patent: Mar. 7, 2000

[54] MULTI-LAYERED FOLDABLE CROSS CONNECT FIELD

[75] Inventor: Bassel Hage Daoud, Parsippany, N.J.

[73] Assignee: Lucent Technologies Inc., Murray Hill, N.J.

[21] Appl. No.: 09/045,168

[22] Filed: Mar. 19, 1998

[51] Int. Cl.[7] ....................................... H04M 3/00
[52] U.S. Cl. .......................... 379/326; 379/325; 379/327; 379/331; 379/332; 379/399
[58] Field of Search ..................... 379/325, 326, 379/327, 331, 399, 412; 179/98

[56] References Cited

U.S. PATENT DOCUMENTS

| | | |
|---|---|---|
| 3,611,264 | 10/1971 | Ellis . |
| 3,869,582 | 3/1975 | Humphrey et al. ........................ 179/98 |
| 4,035,587 | 7/1977 | Undhjem et al. .......................... 179/98 |
| 4,662,699 | 5/1987 | Vachhani et al. . |
| 4,913,659 | 4/1990 | Doyle . |
| 5,363,440 | 11/1994 | Daoud ..................................... 379/399 |

*Primary Examiner*—Jack Chiang
*Assistant Examiner*—Bing Bui

[57] ABSTRACT

A foldable wire distribution field is provided whereby a non-connectorized double sided wire distribution field is hingeably connected and foldable over a standard feeder/protector field to eliminate the need for adjacent feeder fields and distribution fields on a backboard, wall or other structure. The foldable distribution field is preferably configured using double sided tool-less insulation displacement type connectors on the distribution side of the foldable field. The double sided terminal block includes double sided insulation displacement terminal strips with a reversible test feature.

16 Claims, 19 Drawing Sheets

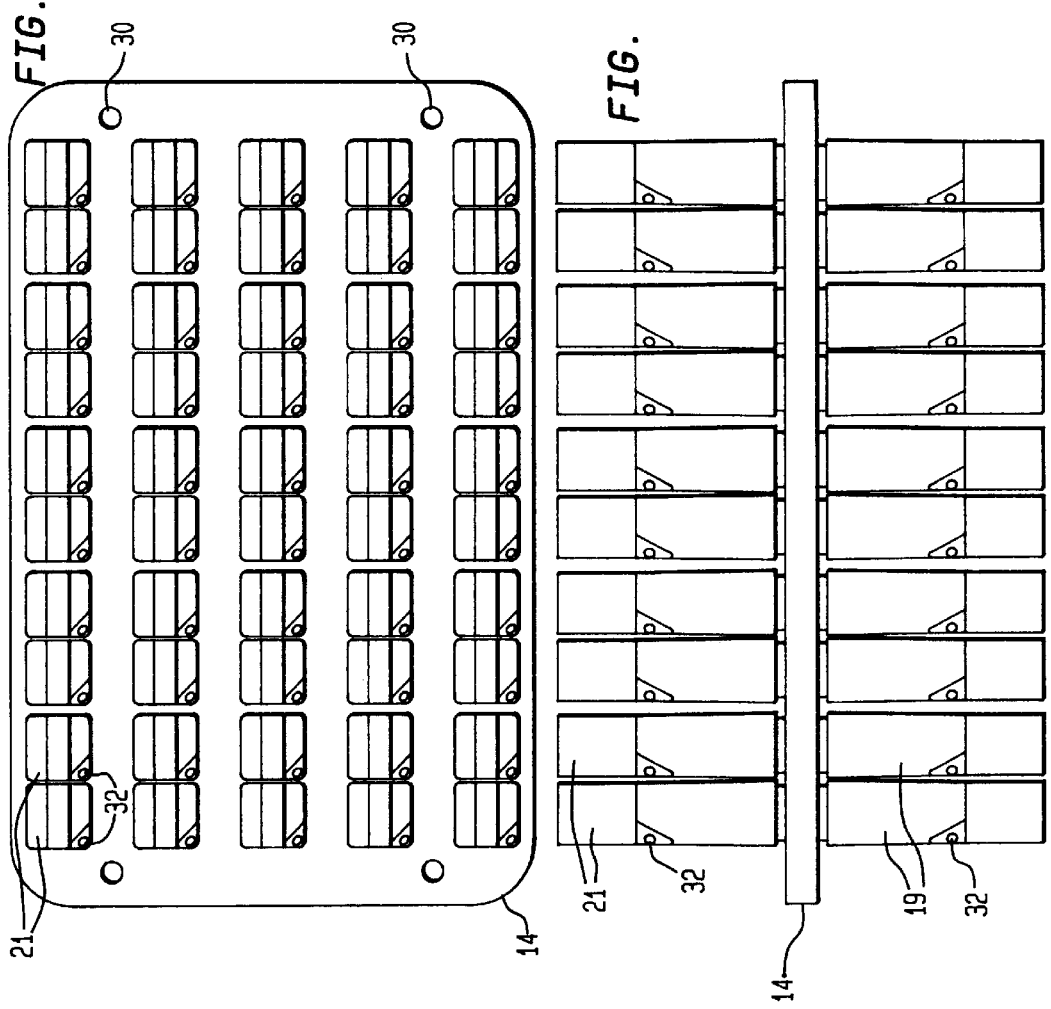

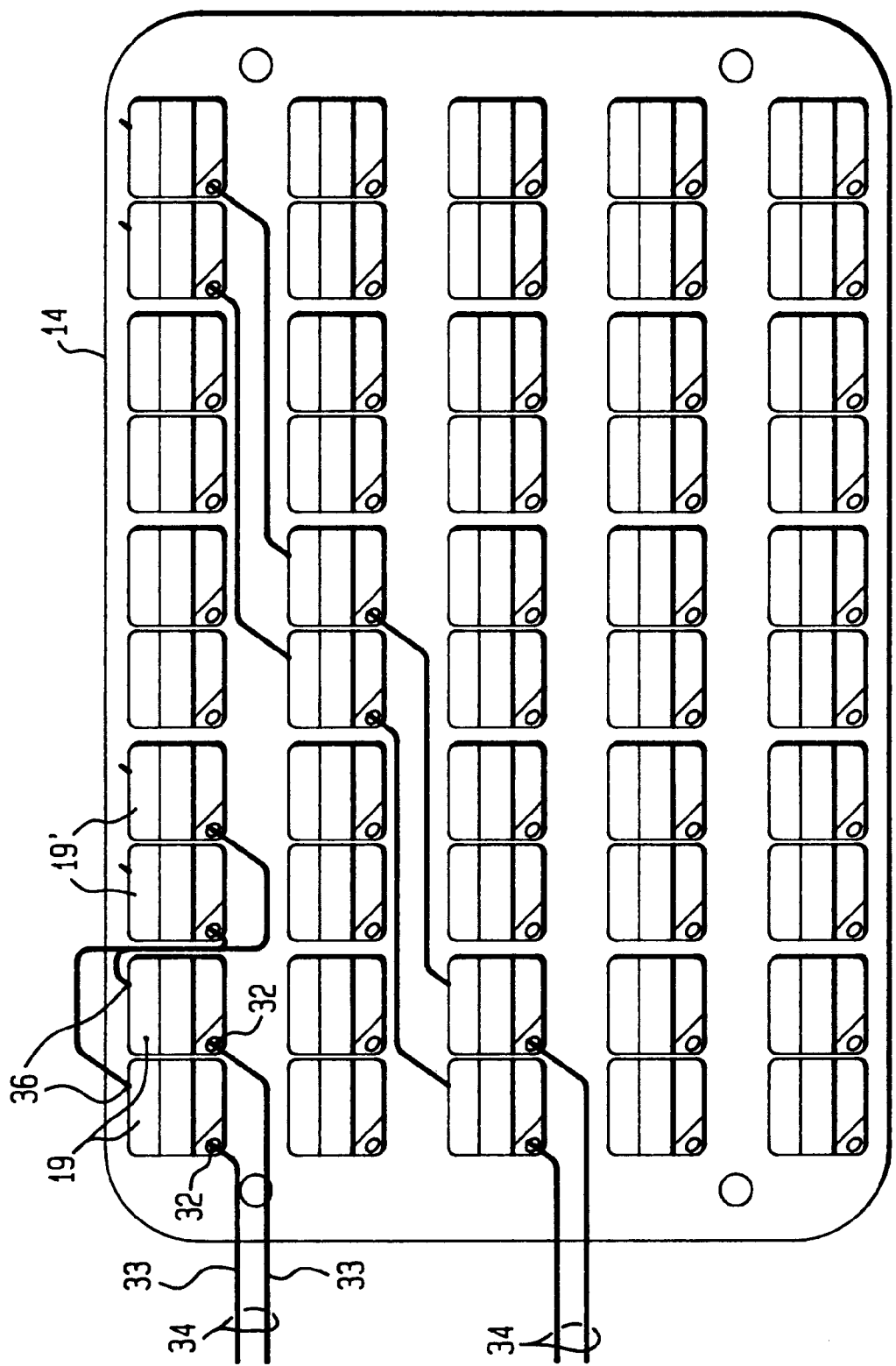

FIG. 19
FIG. 20
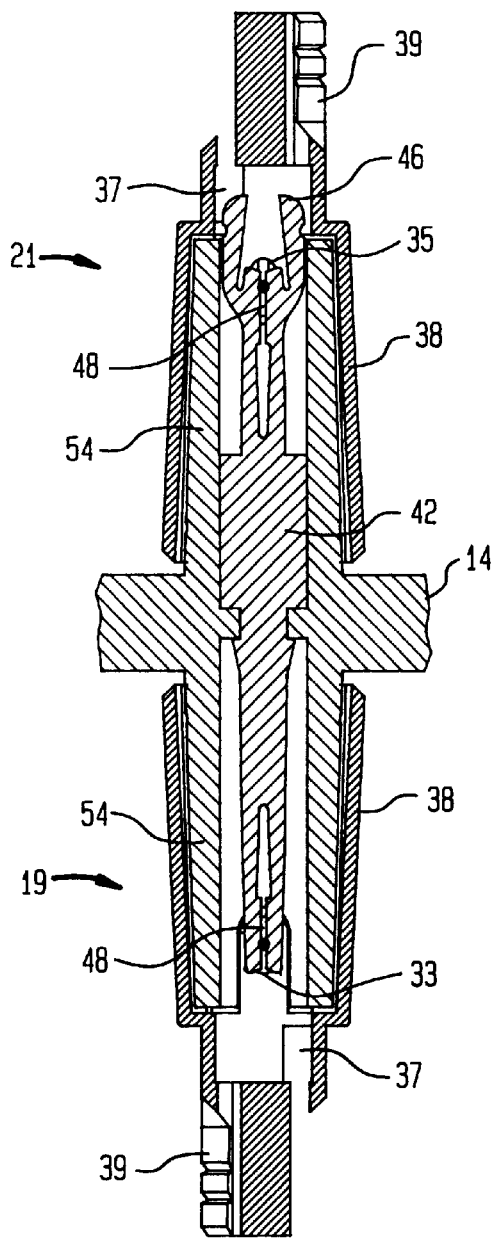
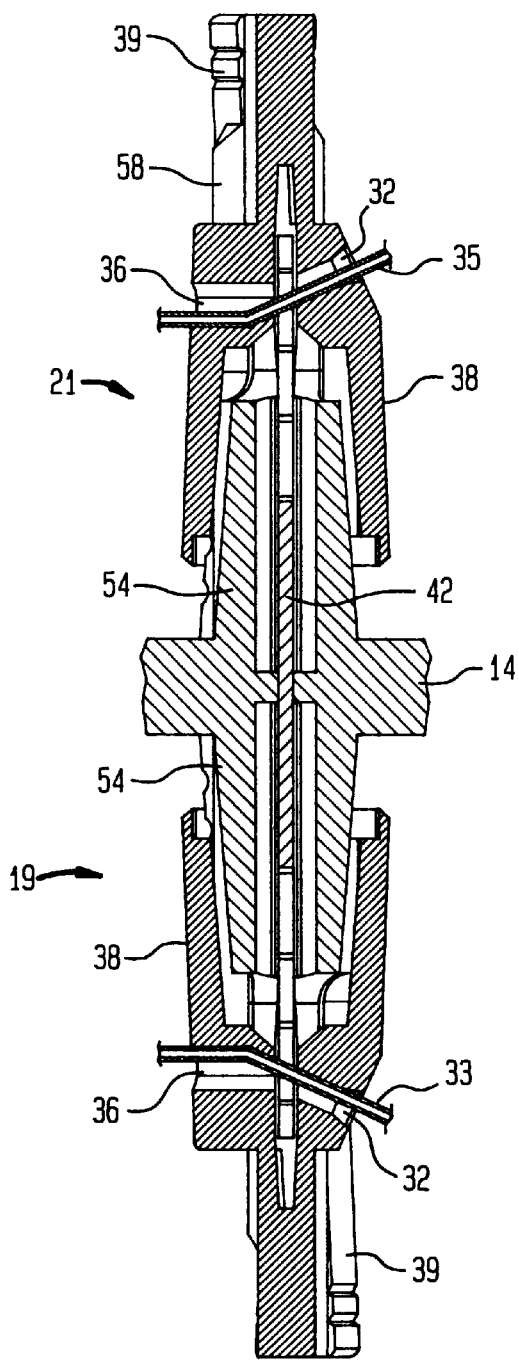

FIG. 22
FIG. 23
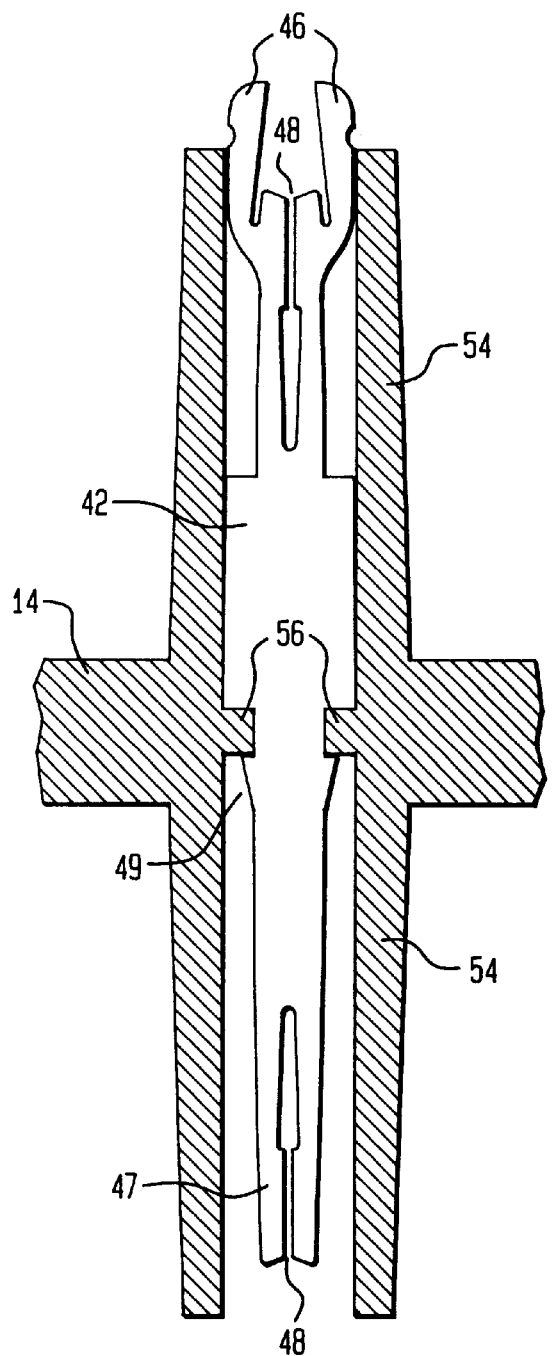
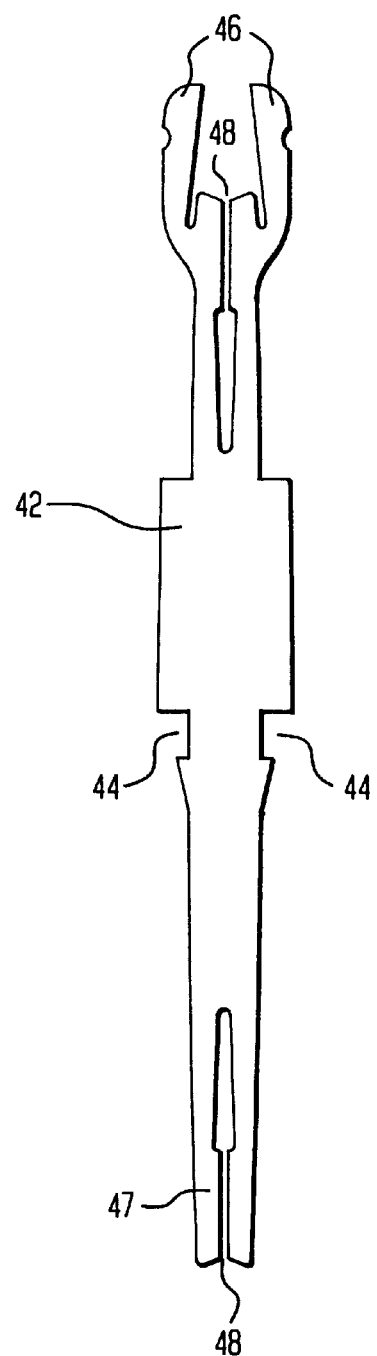

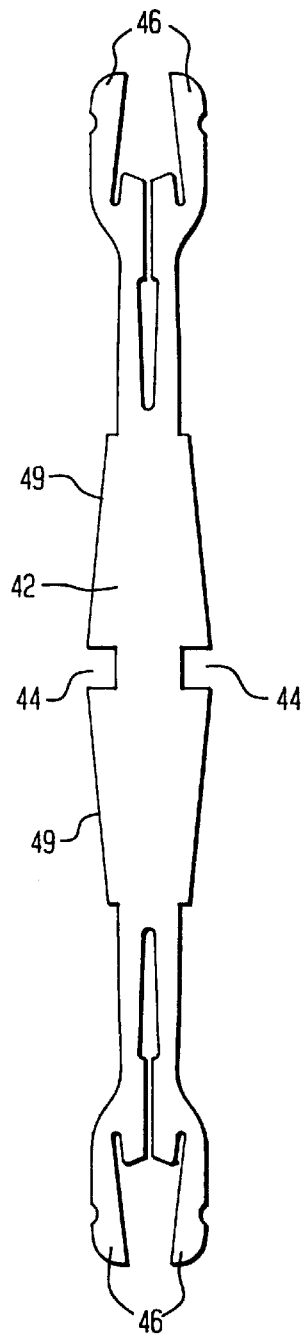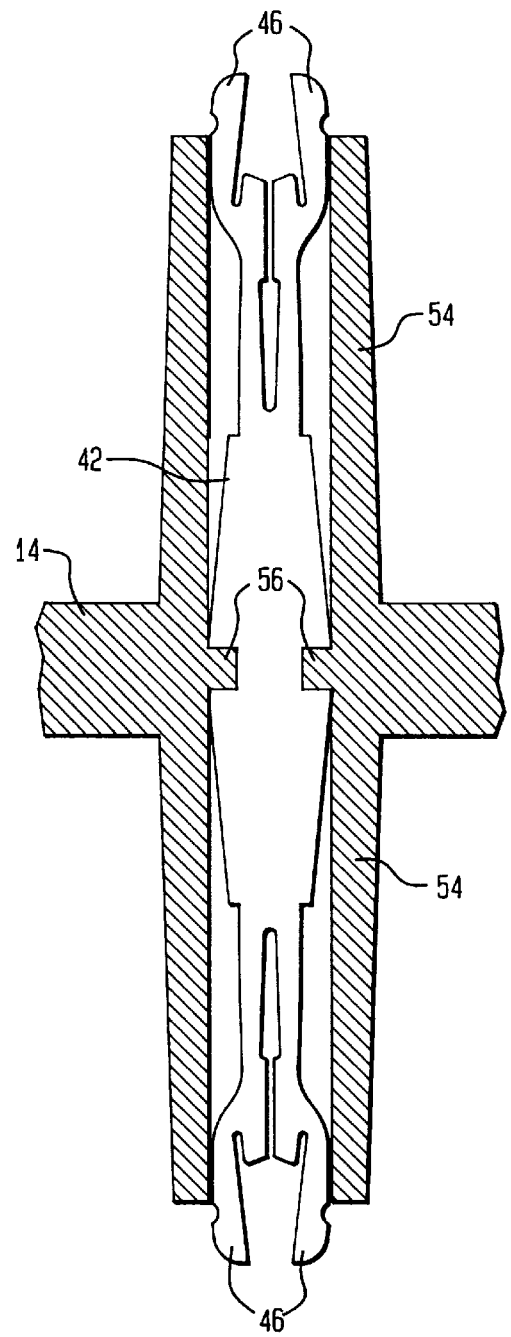

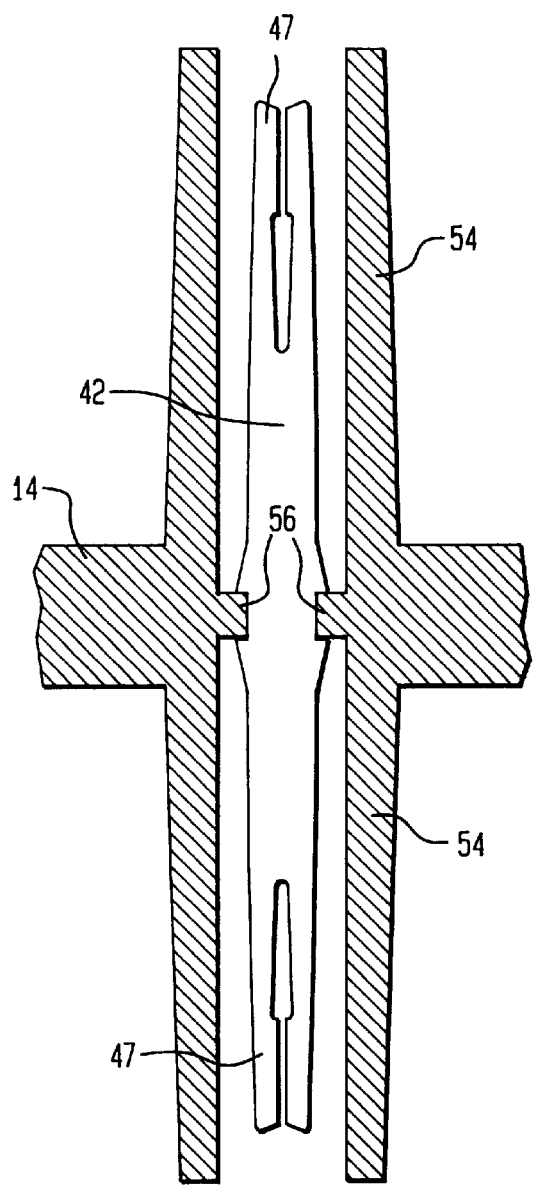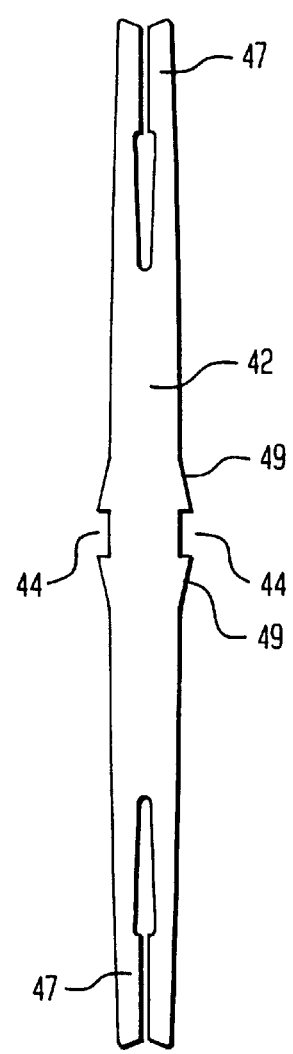

MULTI-LAYERED FOLDABLE CROSS CONNECT FIELD

FIELD OF THE INVENTION

This invention relates to the field of telephone wire distribution systems, and specifically for distribution systems which permit the connection of a single telephone line tip ring wire pair to multiple tip ring wire pairs for the purpose of facilitating multiple connections to a single telephone line.

BACKGROUND OF INVENTION

Telephone lines, which are carried by electrical conductors known as tip ring wire pairs, are generally aggregated at a particular point in a building prior to being distributed and connected to various types of telephone equipment, such as, for example, telephones, fax machines, modems etc. As the tip ring pairs generally enter the building as part of a multi-conductor cable, the individual tip ring wire pairs must first be broken out from the cable into individual wire pairs. This is normally accomplished in a junction box known as, for example, a building entrance protector (BEP), or network interface unit (NIU). Within such devices the individual telephone line tip ring pairs are separated from the cable, individually connected to a connector block, and made available for further electrical connection and distribution. Usually there is a protector device inserted between the telephone and central office, or network side of the telephone line and the customer equipment or terminal side of the telephone line to protect the telephone and user, or other equipment connected to the telephone line, from hazardous overvoltages induced in the telephone network or in the cables passing between the telephone central office and the building within which the line is terminated.

In a typical arrangement, the telephone lines coming from the network are first wired to a protector field, which is an array of connectors for receiving the protector device, which is in turn hard wired to a first connector block which provides a first test point for testing the telephone line connections between the building and telephone central office. This first terminal block is hard wired to a multi pair connector, most typically a twenty-five pair connector of the RJ21 type, for further connection to an array of customer bridges which are also hard wired and connectorized via a mating RJ21 connector. The use of a customer bridge permits a subscriber to disconnect terminal equipment from a telephone line so that a subscriber can isolate troubles on the line as originating in the telephone network, or on the terminal equipment side of the telephone line. An example of such an arrangement is shown in U.S. Pat. No. 5,363,440, dated Nov. 8, 1994, the disclosure of which is incorporated herein by reference. U.S. Pat. No. 5,363,440, depicts a multi-layered network interface unit which results in size economies due to the fact that the customer bridge connector block is hingeably connected to the telephone network protector array field so that rather than placing these two arrays side by side they can be mounted in overlying relationship, resulting in a saving of space.

As is often necessary in office buildings or apartment complexes, and other large structures which require multiple items of terminal equipment to be connected to an individual telephone line, there is yet another connector array or field required to effect the distribution of a single telephone line to multiple points within the structure. This is known as either a cross connect or interconnect field, by which a single telephone line is connected to multiple terminal connection points, thereby permitting a single telephone line to be connected to multiple points within the structure. This cross connect field is placed adjacent to the network interface unit of a building entrance protector to facilitate the further distribution of tip ring wire pairs to either a building riser or multiple horizontal ones in a single story structure. Because the cross connect field is generally at least as large as the feeder field, additional wall space must be occupied by the cross connect field. Thus while the use of multi-layered network interface units has resulted in certain amounts of space saving, the necessity for an adjacent cross connect field still requires a significant investment in space when connecting large numbers of telephone lines to multiple points within a building structure.

SUMMARY OF THE INVENTION

The present invention is directed at overcoming the shortcomings of the prior art. Specifically, the invention is directed to a multi-layered enclosure that contains on a first layer a splice box, a protector array, and a feeder connector block for terminating telephone lines in individual tip ring wire pairs on the feeder array. The feeder array is preferably but not necessarily an array of tool-less insulation displacement connectors (tool-less IDCs), or push cap terminals, of a type known in the art, such as that described in U.S. Pat. No. 4,913,659 dated Apr. 3, 1990, the entire disclosure of which is incorporated herein by reference. Such a connector array is provided on a connector block, and is commercially available under the product designation SC99 from Lucent Technologies Inc.

The first layer is hingeably connected to a second layer, the second layer having a first side which is meant to overlie the feeder field, and a second side which is opposite the first side. The second layer forms the top half of the enclosure, such that when the enclosure is closed, the first side of the second layer overlies the feeder field and the second side is on the outside surface of the enclosure. Opening the enclosure permits ready access to both the feeder field and the first side of the second layer.

Positioned on the first side of the second layer is an array of terminal connectors capable of receiving individual wires which make up of individual tip ring wire pairs. Each of the terminal connectors in this array are electrically connected to a respective connector found in a connector array on the second side of the second layer thus creating an electrical connection from the terminal connectors on the first side of the second layer to a corresponding connector on the second side of the second layer. Rather than there being a hard wired relationship between the terminal pairs of the feeder array on the first layer with a given terminal pair on the second layer, as is customary in the art, the connectors of the first side of the second layer are not connectorized and thus freely and flexibly connectable to any of the tip ring wire pairs representing telephone lines on the feeder array. The connector array on the first side of the second layer is likewise preferably a tool-less insulation displacement connector array, as is the terminal array on the second side of the second layer. When so configured, a double sided insulation displacement connector terminal may be used to form the electrical connection between the connectors on the first side of the second layer with those on the second side of the second layer. It is also possible for the connectors on the respective sides of the second layer to be formed on a common base, and thus the second layer connections may be achieved by utilizing a double sided tool-less IDC connector block having within each connector a double sided IDC terminal strip.

While it is preferred to use a double sided tool-less IDC connector block, it is not necessary to do so, as any of a number of flexible terminal arrangements may be utilized on either side of the second layer provided that the connection methodology permits multiple tip ring connector pairs to be readily wired together to facilitate to multiple appearances of a single telephone line on a first and second sides of the second layer of the enclosure. Thus for example, any combination of the screw type binding post terminal connections, wire wrap terminals, or IDC type connectors may be utilized in the second layer.

As is presently known, tool-less IDC type connectors are configured with a feature that permits a test clip to be clamped onto the cap of the tool-less IDC connector. Because the cap is configured with one or more apertures which provide access to projections or ears on the terminal strip within the connector, an electrical test point is available for testing connections to the tool-less IDC connector without the necessity of removing the attached wire. While this is advantageous for test purposes, it is disadvantageous when the telephone line connected to the connector is one which must remain secure, such as, for example, in the case of an alarm line. In such instances, the ready access to the telephone line from outside the connector may provide an easy way for the alarm circuitry to be circumvented. Thus in the instances where a double sided tool-less IDC connector block is utilized on the second layer, it is preferable to utilize an IDC terminal strip which eliminates the test ears from one or both sides of the IDC terminal strip. In this way, there is no electrical connection point external to the IDC connector, providing for a more secure configuration as required.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWINGS

In the drawing figures, which are not to scale, and which are merely illustrative, and wherein like reference numerals depict like elements throughout the several views:

FIG. 10 is a top plan view of a dual sided tool-less insulation displacement connector block in accordance with the present invention;

FIG. 11 is a left side view of the terminal block of FIG. 10;

FIG. 12 is a bottom side view of the terminal block of FIG. 10;

FIG. 13 is a bottom plan view of the connector block of FIG. 10 showing the paths of individual conductors cross connected thereon;

FIG. 19 is a similar view to that of FIG. 18 with the respective caps of the double sided connector in a downward position showing a conductor stripped and retained therein;

FIG. 20 is a side sectional view taken along section A—A of FIG. 17 showing the double sided connector with the caps in the position depicted in FIG. 18;

FIG. 22 is a cutaway view of a double sided IDC connector showing a preferred metallic IDC terminal strip disposed therein;

FIG. 23 is a front side view of the metallic terminal of FIG. 22;

FIG. 24 is an alternate embodiment of an IDC connector terminal strip for use in a double sided IDC connector block;

FIG. 25 is a partial cutaway showing the double sided terminal strip of FIG. 24 inserted within a connector block;

FIG. 26 is a partial cutaway of a connector block showing inserted therein a further alternate double sided connector terminal; and FIG. 27 is a depiction of the alternate double sided connector terminal shown in FIG. 26.

DETAILED DESCRIPTION OF THE PREFERRED EMBODIMENTS

Figure 1:
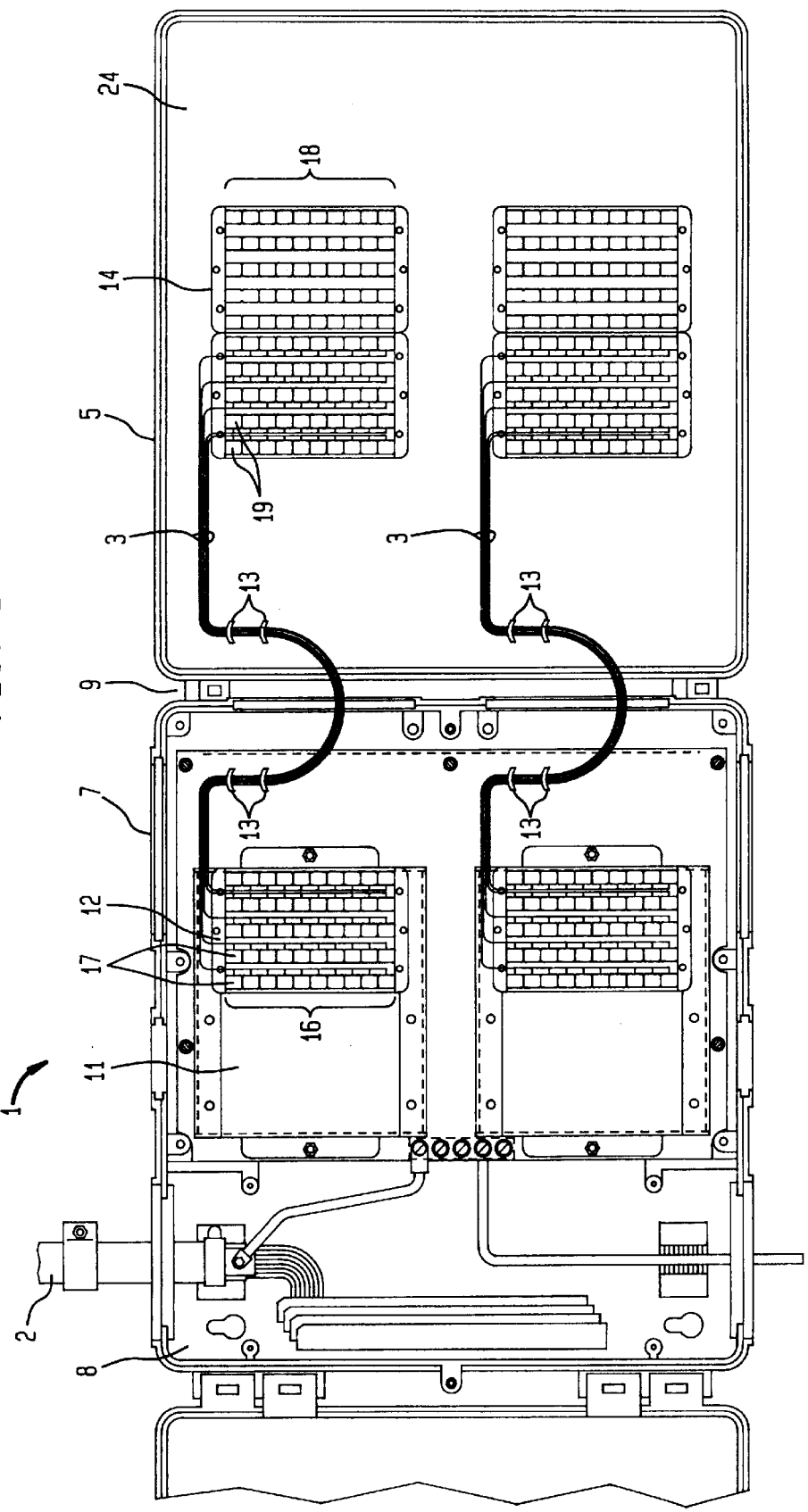
FIG. 1 is a front view of an embodiment of the foldable cross connect field of the present invention, in the unfolded or open position.
Figure 2:
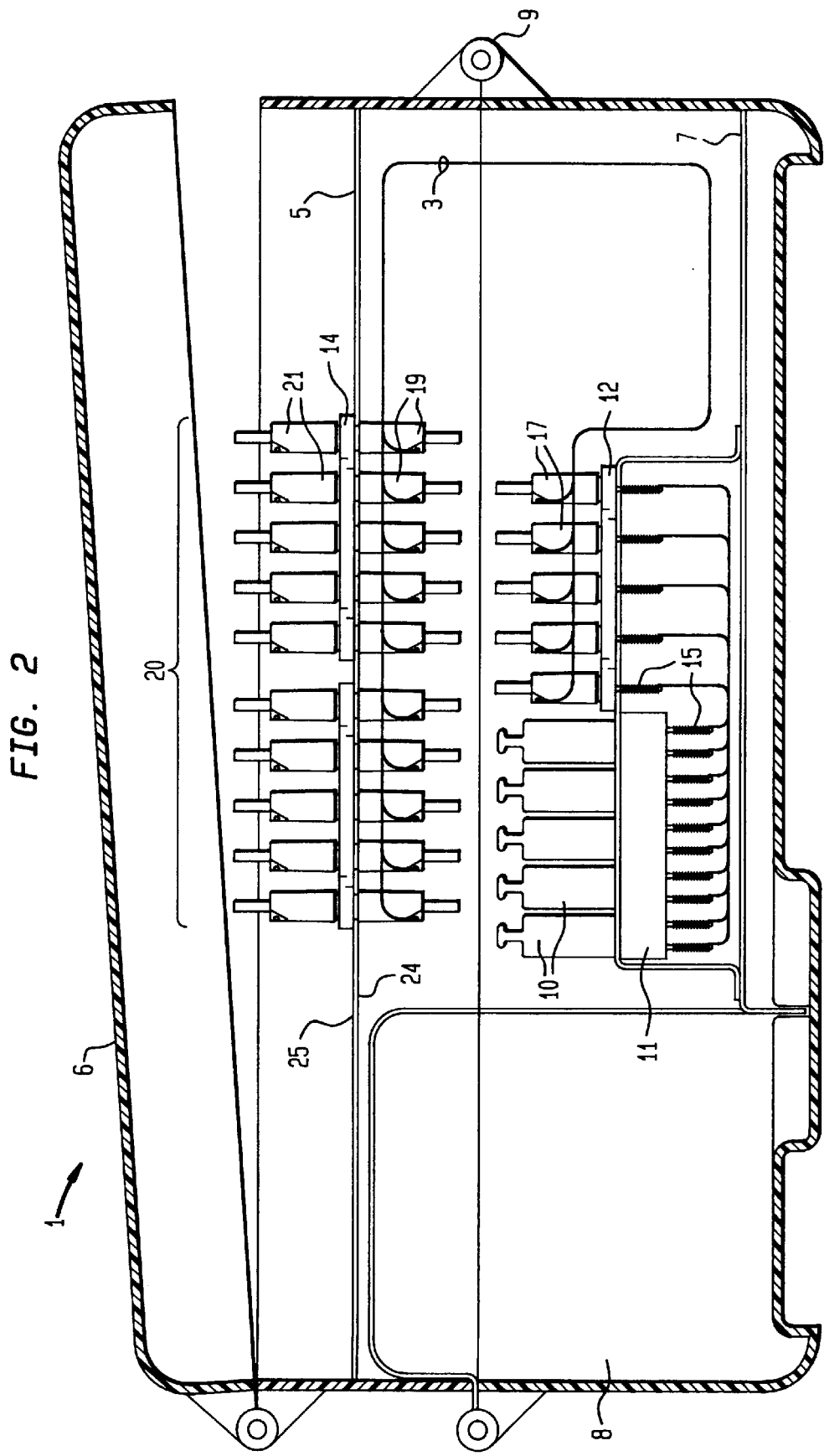
FIG. 2 is a bottom view of the foldable cross connect field of FIG. 1, as seen through the bottom of same, in the folded or closed position.
Figure 3:
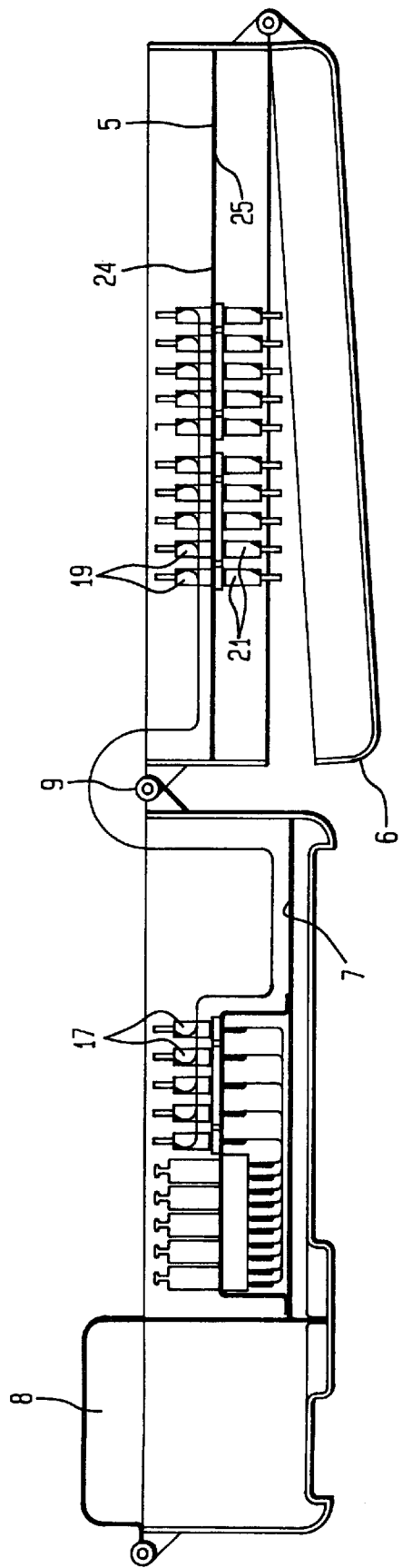
FIG. 3 is a bottom view of the foldable cross connect field of FIG. 1, as seen through the bottom wall of same, in the open position.

With initial reference to FIGS. 1 through 3, there is depicted foldable a multi-layer cross connect field in accordance with the present invention. The cross connect field is preferably configured as an enclosure for use as, by way of non-limiting example, a building entrance protector (BEP) and cross connect field or a network interface unit (NIU) and cross connect field. The enclosure has a bottom layer 7 generally forming the bottom half of the enclosure and a top layer 5 generally forming the top half of the enclosure. Optionally, an outer cover 6 may be provided for further sealing the enclosure. The enclosure 1 consists of a splice chamber 8 of a type known in the art, for receiving a feeder cable 2 consisting of multiple pairs of electrical conductors, each pair representing the tip and ring leads of a telephone line coming from a telephone central office or other telephone network facility. It is also possible for the invention to be utilized in private branch exchange (PBX) or Centrex environments, with the lines being PBX lines or Centrex lines rather than network lines. Indeed the skilled practitioner will recognize, from the teachings herein, the applicability of the present invention to myriad telephone distribution applications. The enclosure may be fabricated of metal, plastic, synthetic resin or any combination thereof, or any other material suitable to the application in which the invention will be deployed, as a matter of design choice.

The individual tip ring wire pairs from feeder cable 2 are connected through input connectors or through direct wire terminations, in a manner known in the art, to a protector field 11 containing, for each tip ring wire pair, a protector device 10 for providing overvoltage protection on the telephone line. The protector field 11 is hard wired to a feeder field connector block 12 through fixed wire connections, typically effected through wire wrap terminals 15, to a first connector array 16. The first array 16 consists of a plurality of first connectors 17 arranged in pairs in the array, each connector pair terminating a particular tip ring wire pair of a particular telephone line coming from the telephone network. While in a conventional multi-layered box the feeder field would also be connectorized and each tip ring pair associated with a dedicated terminal pair in a further connector block, the feeder field connector block 12 of the present invention is not connectorized, so as to permit individual wire conductors to be passed from the first connectors 17 of the first connector array 16 to a subsequent second connector array 18, described further hereinbelow.

Referring again to FIG. 1, the top layer 5 of enclosure 1 is hingeably connected to bottom layer 7 via a hinge 9. Hinge 9 may be any pivotable connection permitting relative angular movement between layers 5 and 7, such as, for example multiple individual hinges, a piano hinge, a living hinge, or other art recognized pivotable connection.

FIG. 2 depicts the folded, or closed position of top layer 5, wherein a first side 24 of top layer 5 overlies the bottom layer 7. The second side 25 of top layer 5 faces outwards and away from bottom layer 7. FIG. 3, like FIG. 1, depicts the open, or unfolded position of top layer 5, wherein the first array 16 and the second array 18 are side by side and exposed to view for access by a telephone installer or other skilled workmen requiring access to the various connection points in the enclosure 1. A securement device (not shown) such as a lock, latch, screw, magnetic closure or other means may be optionally provided to maintain the enclosure in the folded, closed position.

Referring once again to FIG. 1, the connections between the first array 16 and the second array 18 are made by connecting individual electrical conductors from the first connector 17 of first array 16 to a second connector 19 of second array 18 in the manner associated with the particular connector type included in the respective arrays. Groups of conductors 3, which may be bundled together or not, as a matter of choice for the workmen skilled in the art, traverse hinge 9, preferably as shown.

Specifically, as seen in FIG. 1, there may be provided within enclosure 1 a number of wire guides 13 through which the conductors may be passed and guided into a particular path across hinge 9. Preferably, the wire guides 13 are arranged in such a manner as to cause the conductor bundle 3 to travel in a direction substantially parallel to the axis of rotation of hinge 9 for a distance, and then traverse hinge 9 with sufficient slack to form a U-shaped path as hinge 9 is traversed, whereupon the bundle is guided once again in a direction substantially parallel to the axis of rotation of hinge 9 by the wire guides 13 on top layer 5. When guided in such a fashion, during opening and closing of the enclosure 1 the wires are not subjected to purely bending forces, as they would if the bundles were made to traverse the hinge in a path generally perpendicular to the axis of rotation of the hinge, but, rather, they are subjected to both bending and twisting forces, greatly increasing the life span of the conductors and reducing the stresses associated with opening and closing of the enclosure.

In tests conducted on a 25 pair cable arranged to cross a hinge in manner known in the art, the cable failed after approximately 400 opening and closing cycles. A similar cable, when guided across the hinge in the above described preferred manner, as depicted in FIG. 1, survived over 6,000 opening and closing cycles without failure.

Referring once again to FIGS. 2 and 3, there is shown a third connector array 20 made up of third connectors 21, preferably forming a part of a double sided distribution field connector block 14 which comprises second connectors 19 on one side of the block and third connectors 21 on the opposite side of the block 14. Each connector 19 is electrically connected via a metallic contact or terminal strip with the associated respective matching connector 21 oriented on the opposite side of block 14. Thus, an electrical conductor connecting a first connector 17 and a second connector 19 would in effect connect connector 17 to connector 21. Distribution connector block 14 is preferably mounted on the second, outwardly facing side 25 of top layer 5 of enclosure 1. Optionally, a cover 6 may optionally be provided to further enclose and protect third array 20 when top layer 5 is in the closed position.

Preferably, feeder field connector block 12 is a tool-less insulation displacement connector (tool-less IDC) type connector block, such as, for example, a type SC99 terminal block as sold by Lucent Technologies Inc. Such a connector facilitates simple and efficient connection of individual conductors in the connector, as the IDC type connector, which requires no tools, strips and electrically connects a conductor to a metallic terminal in one simple step. Additionally, the double sided distribution field connector block 14 is preferably a double sided tool-less IDC connector, as further described hereinbelow. It will, however, become further evident that the particular types of connectors deployed in the first, second and third connector arrays are a matter of application specific design choice. In short, regardless of the connector type deployed, by forming a dedicated electrical connection between individual connectors in the second and third arrays, and by permitting flexible connection between the first and the second connector arrays, multiple connections can be made between a first connector 17 of first array 16 and multiple connectors 21 of third array 20 by connecting an electrical conductor between connector 17 and multiple connectors 19 of the second array 18. In this manner, the cross connect or interconnect function, formerly implemented in the prior art via multiple fields of connectors configured on adjacent, separately mounted arrays, can be accomplished in a single enclosure, which, when closed, consumes far less space on a backboard, permitting greater connection density in a smaller space.

Figure 4:
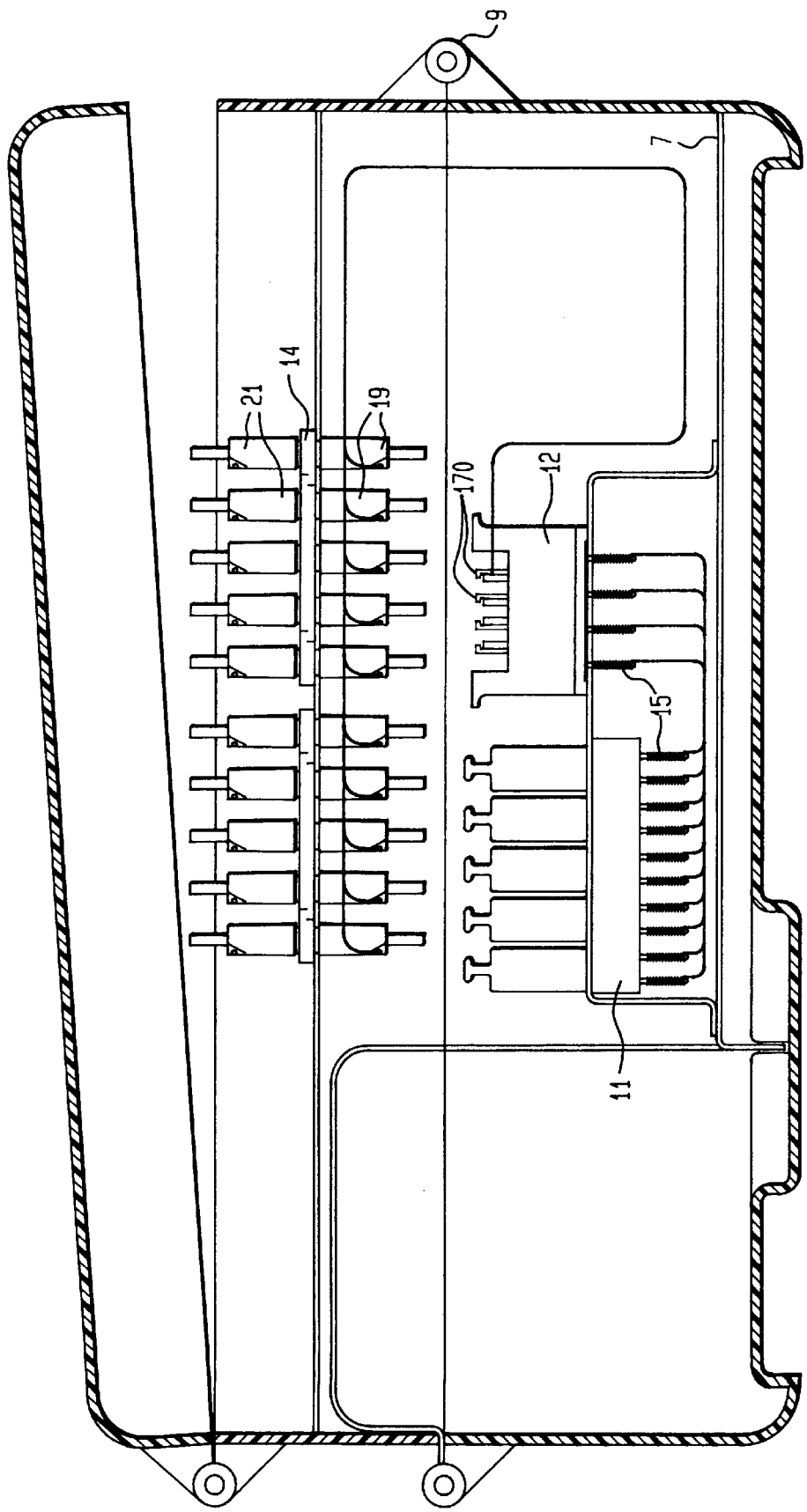
FIG. 4 is an alternate embodiment of the foldable cross connect field of the present invention as seen the closed position.
Figure 5:
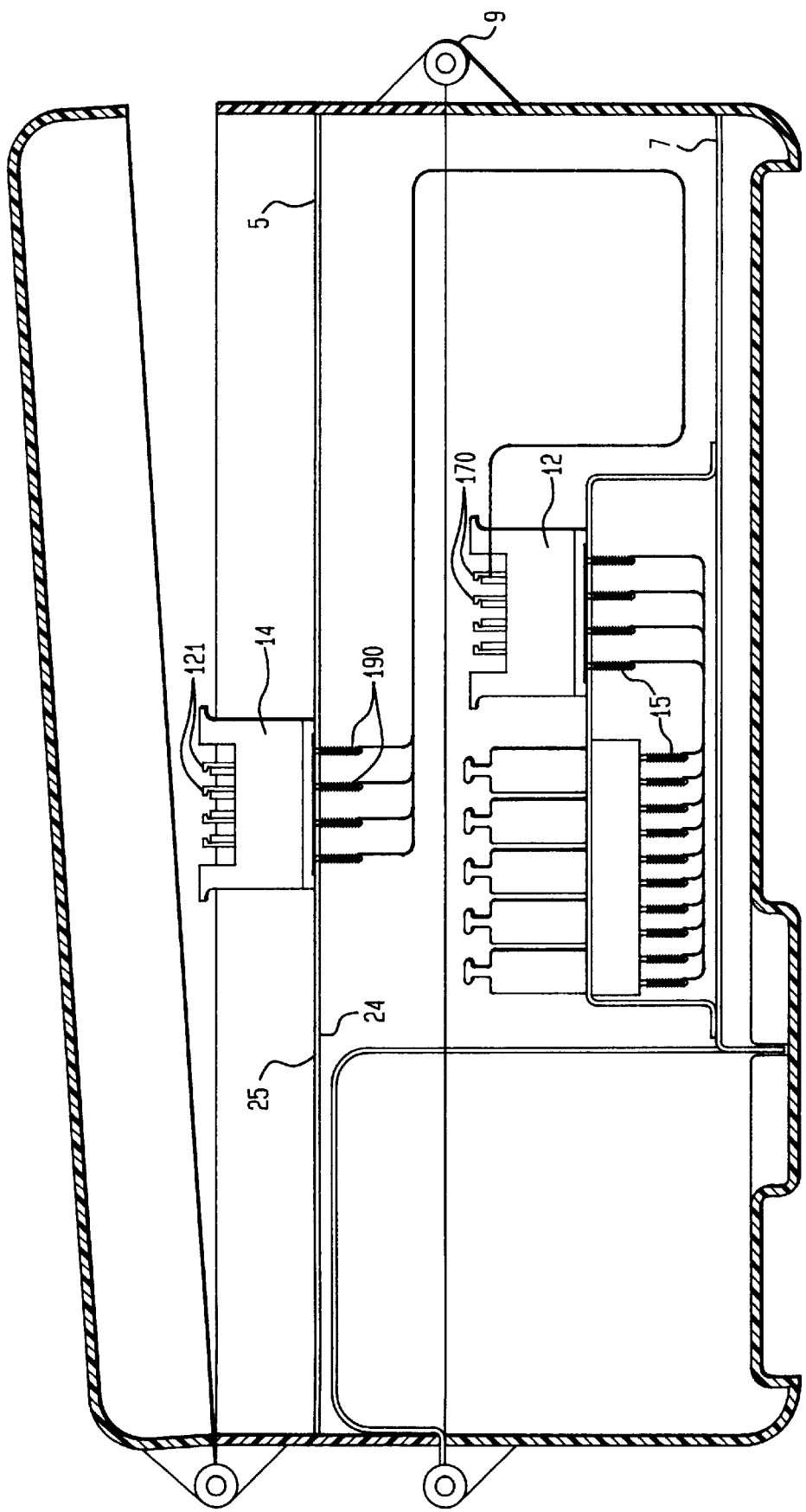
FIG. 5 is still another alternate embodiment of cross connect field of the present invention.
Figure 6:
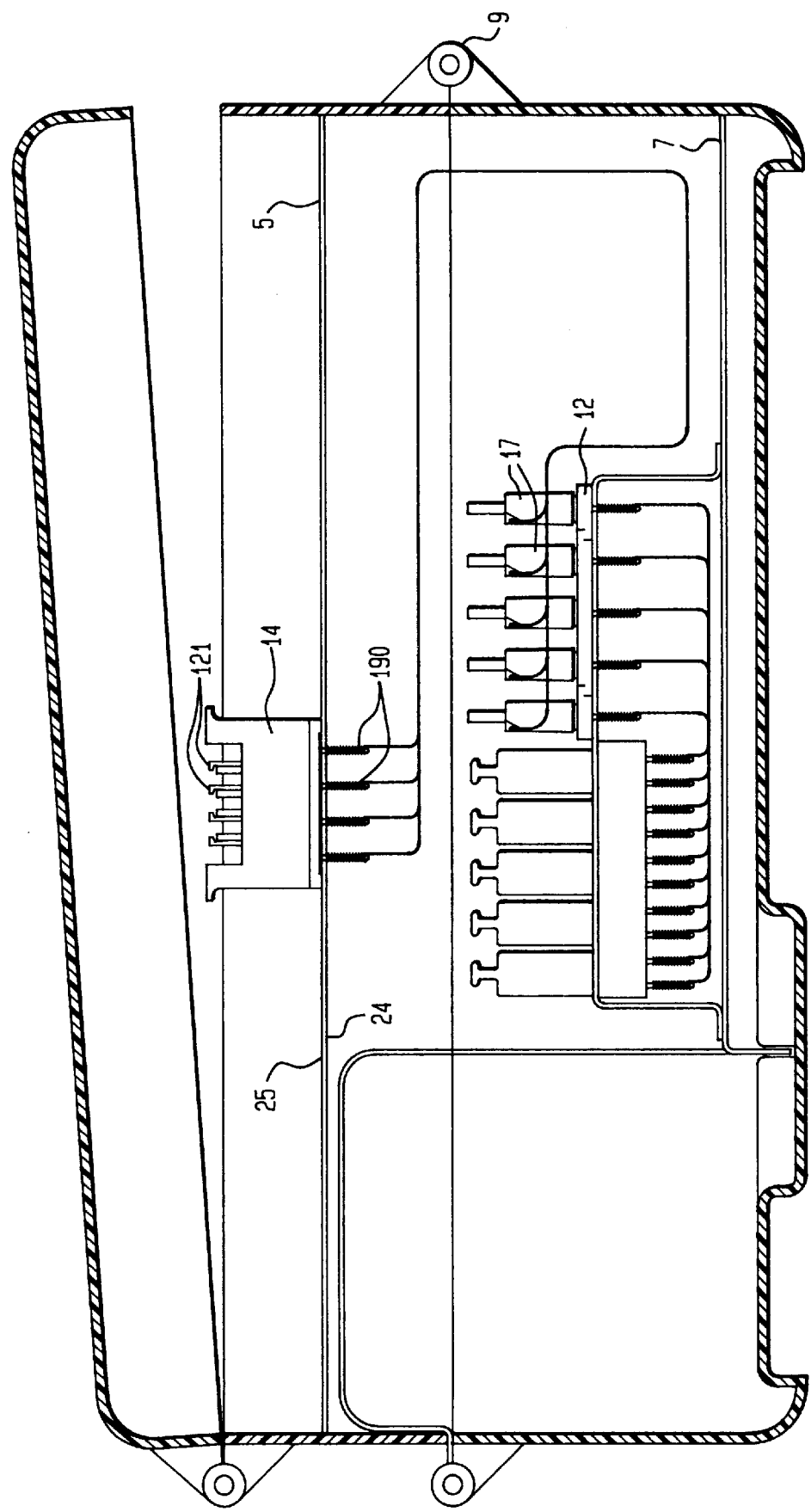
FIG. 6 is a still further embodiment of the cross connect field of the present invention.
Figure 7:
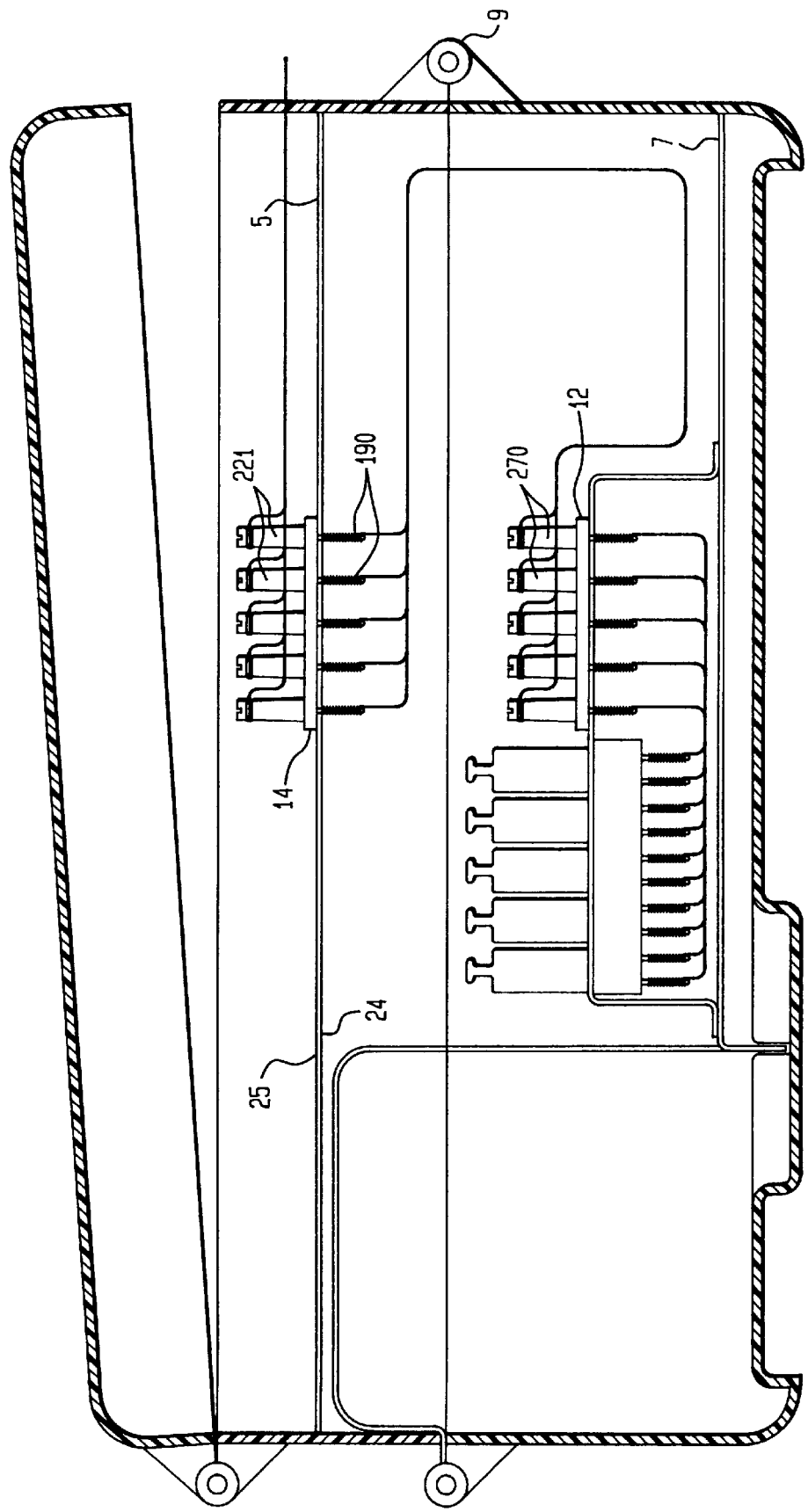
FIG. 7 is another alternate embodiment of the cross connect field of the present invention.
Figure 8:
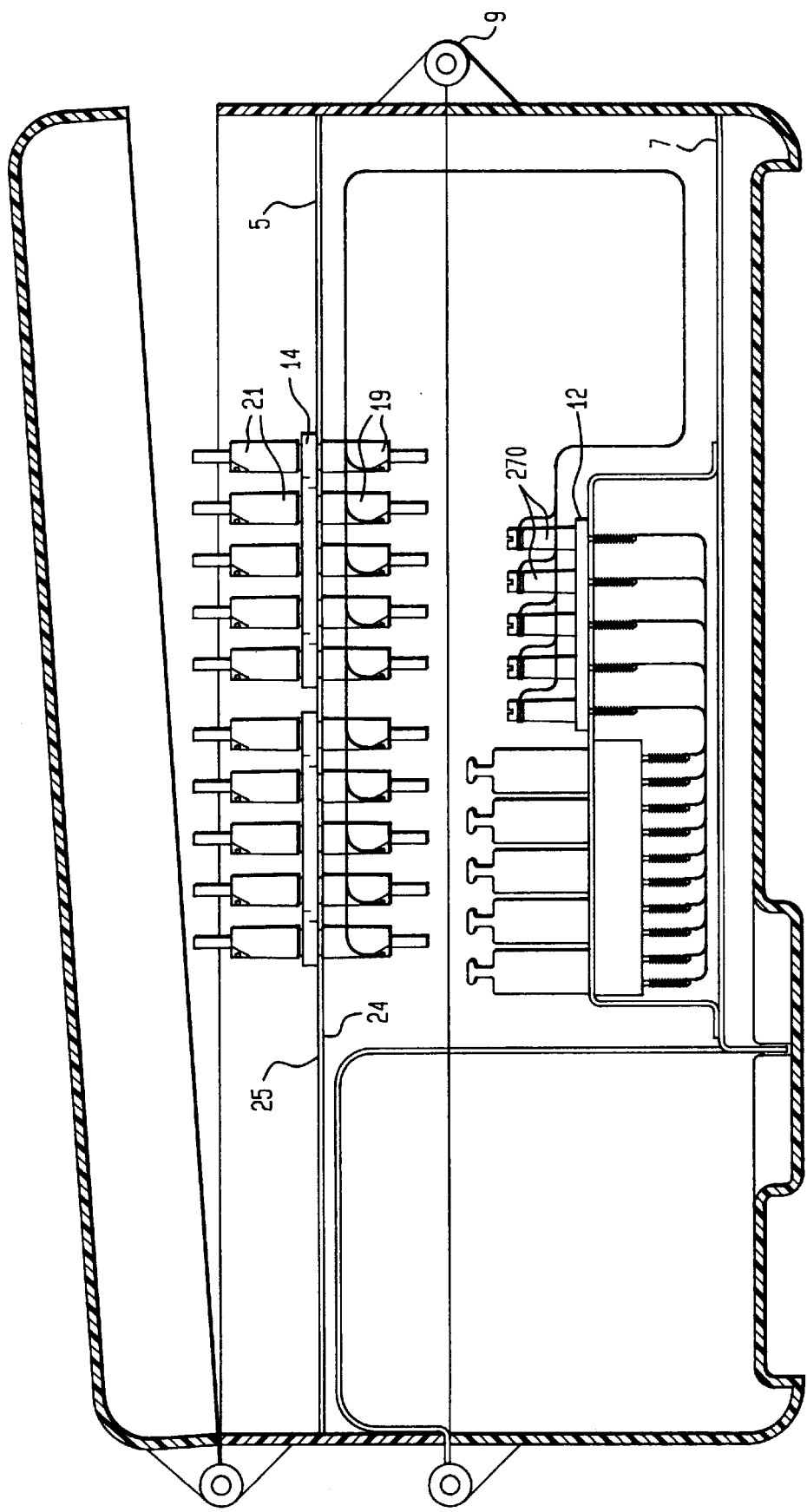
FIG. 8 is still another alternate embodiment of the cross connect field of the present invention.
Figure 9:
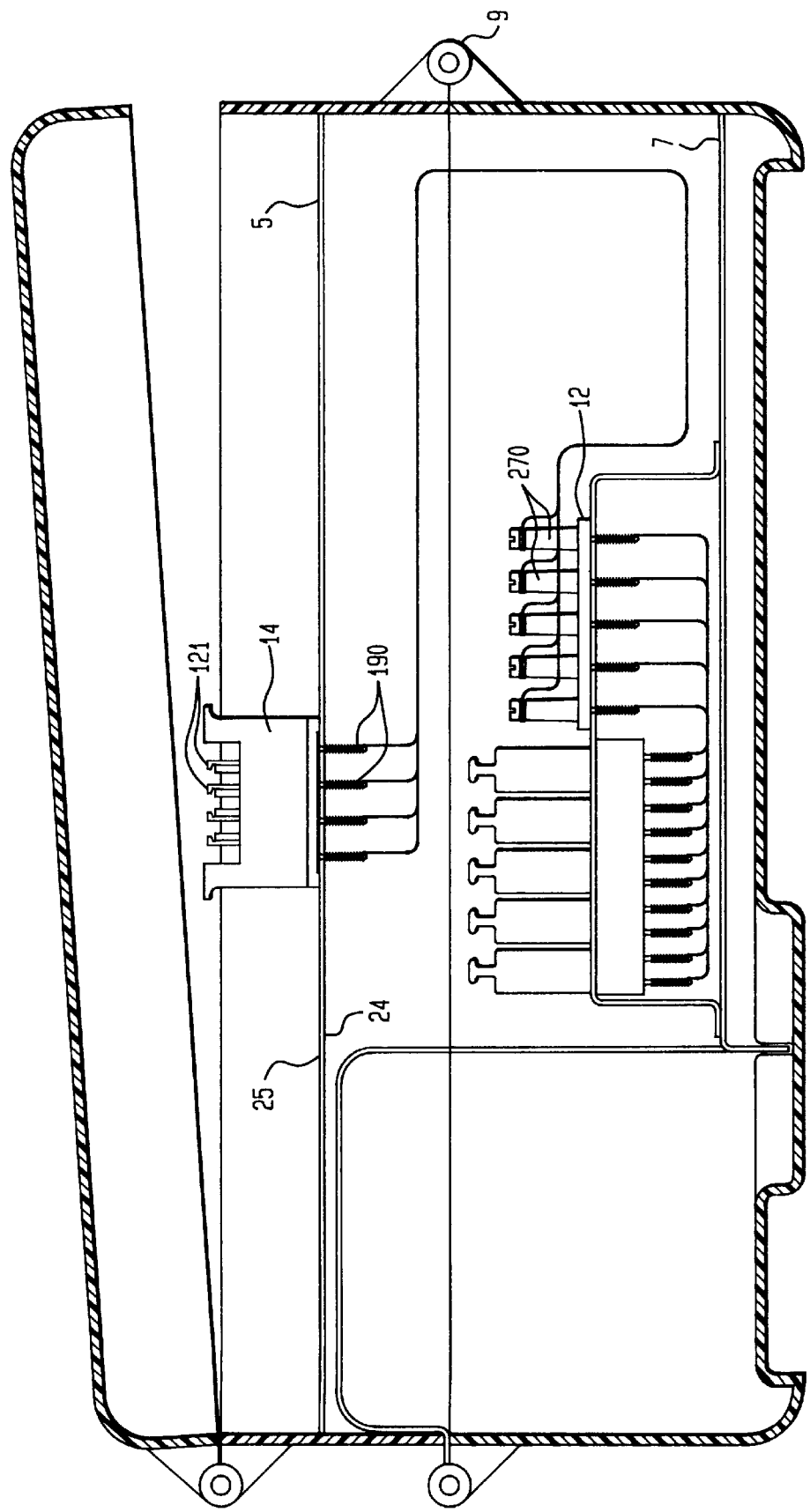
FIG. 9 is yet another alternate embodiment of the cross connect field of the present invention.

With reference now to FIGS. 4 through 9, there are a depicted a number of examples of combinations of first, second and third connector arrays which may be deployed in the enclosure of the present invention. Referring to FIG. 4, there is shown a feeder field connector block 12 containing an array of insulation displacement type connectors 170 commonly referred to in the industry as punch down connectors. Such a block is often commonly referred to as a "66-type" connector block. Block 12 contains wire wrap terminals 15 on an under side of the block 12, which are hard wired to a protector field 11. Telephone line pairs are connected to a specific pair of connectors 170 on block 12 through the wire wrap terminals 15 in a manner known in the art. Individual conductors may then be connected to connectors 170 and any one or a number of combinations of pairs of connectors 19 on the second connector array 18 on block 14. In this manner, multiple line appearances are available at connectors 21, thus facilitating the cross connect function described above. Similarly, with respect to FIG. 5, the connector block 12 and the distribution block 14 may both be 66-type connector blocks, with the cross connections being made between a pair of connectors 170 to one or multiple pairs of wire wrap terminals 190 on block 14, resulting in multiple line appearances at the IDC connector side of block 14 via IDC connectors 121. Alternatively, feeder connector block 12 may be a single sided tool-less IDC type connector, while distribution connector block 14 is a 66-type connector block. Telephone line appearances at a pair of terminals 17 of feeder connector block 12 may be connected to one or multiple wire wrap terminal pairs 190 to facilitate one or multiple line appearances at IDC connectors 121. With references to FIG. 7, both feeder connector block 12 and distribution connector block 14 may be of the binding post type, wherein a telephone line appearing on a dedicated pair of binding posts 270 are connected to one or more pairs of wire wrap terminals 190 on block 14 so as to create multiple line appearances on binding posts 221 of block 14. FIG. 8 depicts the use of a binding post type connector block as the feeder connector block 12 having dedicated telephone line connections to binding posts 270, which line appearances may be connected to one or multiple tool-less IDC connectors 19 on block 14 to facilitate multiple line appearances at tool-less IDC connectors 21 on block 14. As depicted in FIG. 9, feeder connector block 12 may be a binding post type connector and distribution connector 14 may be a 66-type IDC connector, providing, as discussed above, the flexible connection of conductors from telephone line connector pairs 270 to wire wrap terminals 190 to facilitate wide distribution of the telephone to single or multiple conductor pair appearances on connectors 121 of distribution block 14. Thus it will be recognized that myriad combinations of connector blocks may be utilized within the foldable cross connect field of the present invention, permitting the deployment of the invention in numerous applications and locations, as limited only by the creativity of the person skilled in the art, utilizing the teachings of the present invention.

As discussed, the present invention is preferably deployed using a double sided tool-less IDC connector 14 as depicted in FIGS. 10 through 12. Present tool-less IDC connectors, such as the SC99 type IDC connector block from Lucent Technologies Inc., comprise a tool-less IDC connector array on one side and a series of dedicated wire wrap terminals on the opposite, such as the feeder connector block 12 depicted in the FIG. 2. With reference to FIGS. 10 through 12, a double sided tool-less IDC connector block of the present invention contains an array of connectors 21 on one side of the connector block and a respective matching set of IDC connectors 19 on the opposite side thereof. Each connector 19 is electrically connected to its matching opposite connector 21 on the opposite side of connector block 14 via an internal metallic IDC terminal strip (terminal 42, FIG. 14) discussed further below. Thus, an electrical conductor inserted into wire insertion hole 32 of connector 19 will be electrically connected to its matching connector 21 on the opposite side of block 14 and available for connection through a wire insertion hole 32 on connector 21.

IDC connectors 19 and 21 comprise a cap 38 through which an electrical conductor may be inserted through insertion hole 32. At the top of each cap 38 is a cap grip 39 which facilitates gripping by an installer or other user for moving the cap between its two available positions for insertion and stripping and connection of an electrical conductor, in a manner known in the art. Connector block 14 is also typically provided with mounting holes 30 to facilitate mounting of the block 14 to the inner surface of enclosure 1 via screwing or riveting. It will, of course, be recognized that the precise method of securing block 14 to the respective layers of an enclosure is a matter of design choice within the skill of the routineer in the art, and may be achieved via screwing, riveting, adhesion, snap fitting, or any other recognized method of achieving a firm mechanical connection between the block and the structure to which it will be mounted.

Referring to FIG. 13, there is shown one side of a double sided IDC connector as utilized as a distribution connector block 14. Telephone wire pair 34, made up of individual conductors 33, are connected to a dedicated line pair on connector block 12 (not shown). The individual conductors 33 of tip ring pair 34 may be readily connected to one or multiple connectors 19 to facilitate the appearance of telephone line pair 34 on multiple pairs of connectors on block 14. Specifically, and with additional reference to FIGS. 14 through 16, an individual conductor 33 may be fed through an insertion hole 32 in a cap 38 of tool-less IDC connector 19. Rather than inserting the conductor 33 just far enough into cap 38 to facilitate connection, the conductor may be fed completely through insertion hole 32 and out through exit hole 36 for further connection to another connector 19', so as to facilitate the connection of multiple connectors to the single electrical conductor 33. As seen in FIG. 13, by threading a single conductor 33 into and out of multiple connectors 19, numerous connections or "taps" may be made to a single telephone line terminated on connector block 14.

Figure 14:
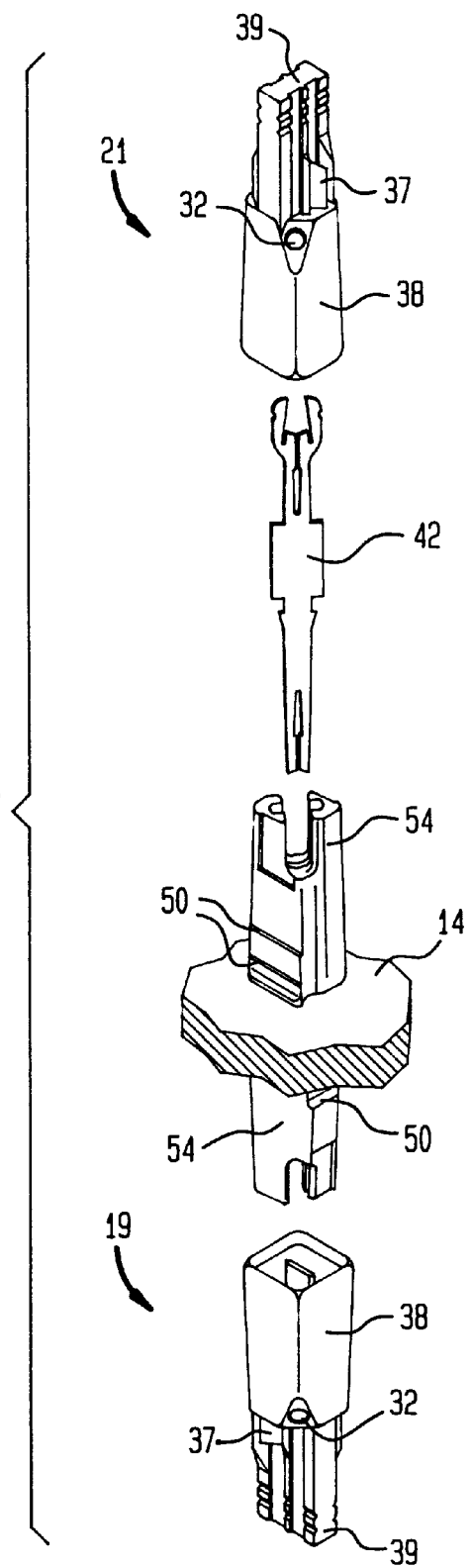
FIG. 14 is an exploded perspective view of one tool-less double sided connector forming a part of the connector block of FIG. 10.
Figure 15:
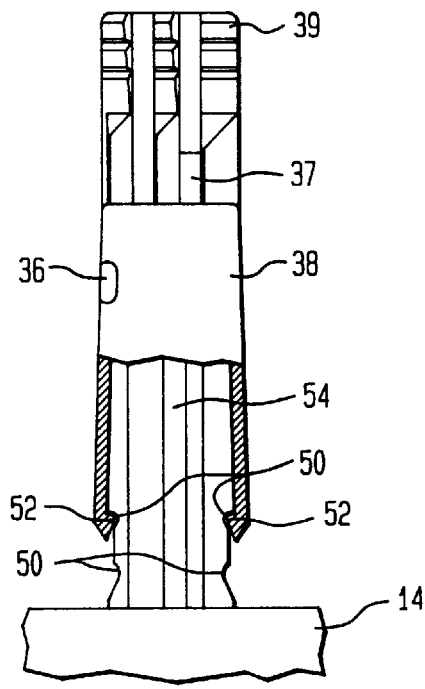
FIG. 15 is a partial cutaway view of a single side of the double sided connector of FIG. 10 with the cap placed in a position of readiness to receive an individual conductor.
Figure 16:
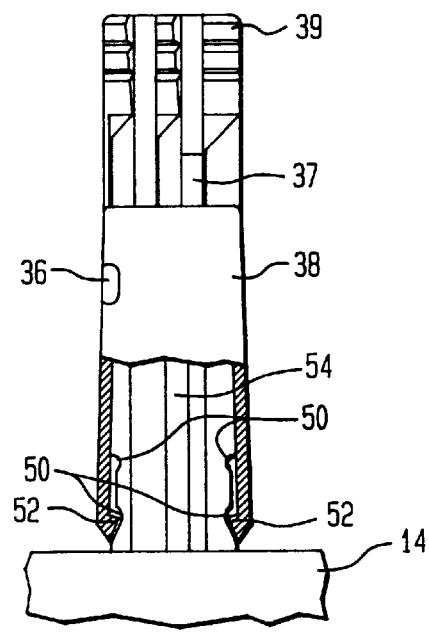
FIG. 16 is a partial cutaway view of the connector of FIG. 15 with a cap pushed downward into a position which would retain and displace the insulation of an individual conductor.

In further detail, and with reference to FIGS. 14 through 16, each IDC connector on double sided connector block 14 comprises a base portion 54 upon which moveable cap 38 is positioned. Cap 38 is movable from a first upper position, wherein protrusions 52 mate with an upper set of detents 50. In this position a wire may be inserted through entrance hole 32 and fed out through exit hole 36 without the electrical conductor making contact with the metallic terminal strip 42 within the connector 19. After the conductor is positioned in a desired fashion through cap 38, the cap is pushed down by pressing on cap grip portion 39, which causes the metallic conductor to encounter the metallic terminal 42 which strips the insulation from and grips the metallic conductor within conductor 33, in a manner known in the art. To facilitate testing of connections made through the connector, a test aperture 37 is provided in an upper portion of cap 38 to permit access to the ends of metallic terminal 42 for the application of test leads, thereby facilitating an electrical connection to the conductor 33 without the need to disconnect it from the connector to perform testing.

As seen in FIG. 14, cap grip portion 39 contains textured features to facilitate gripping by an installer to simplify the movement of cap 38 between its upper open position, where it is ready to receive a conductor, and its lower closed position whereby the conductor is stripped and gripped by the terminal within the connector.

Figure 17:
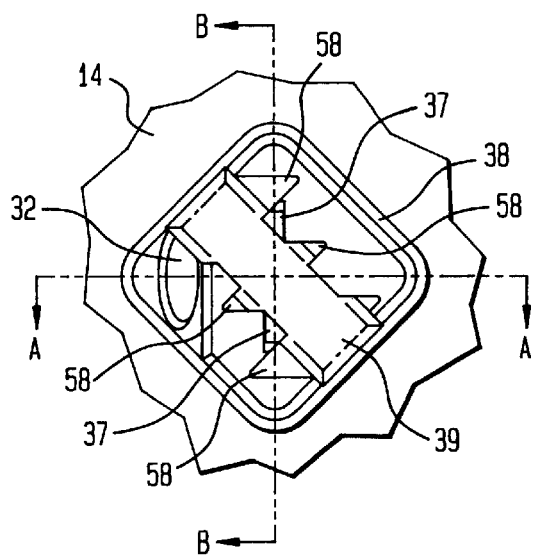
FIG. 17 is a top view of an individual connector of the connector block of FIG. 10.

Referring to FIG. 17, there is shown a top view of a top portion of a connector block 14 depicting additional features in the cap grip 39. Specifically, the test aperture 37 is positioned so as to be recessed within cap grip protrusions 58 so that upon gripping a cap after insertion of a metallic conductor, the user's fingers are kept away from an exposed portion of the metallic terminal 42 within the connector, for safety reasons.

Figure 18:
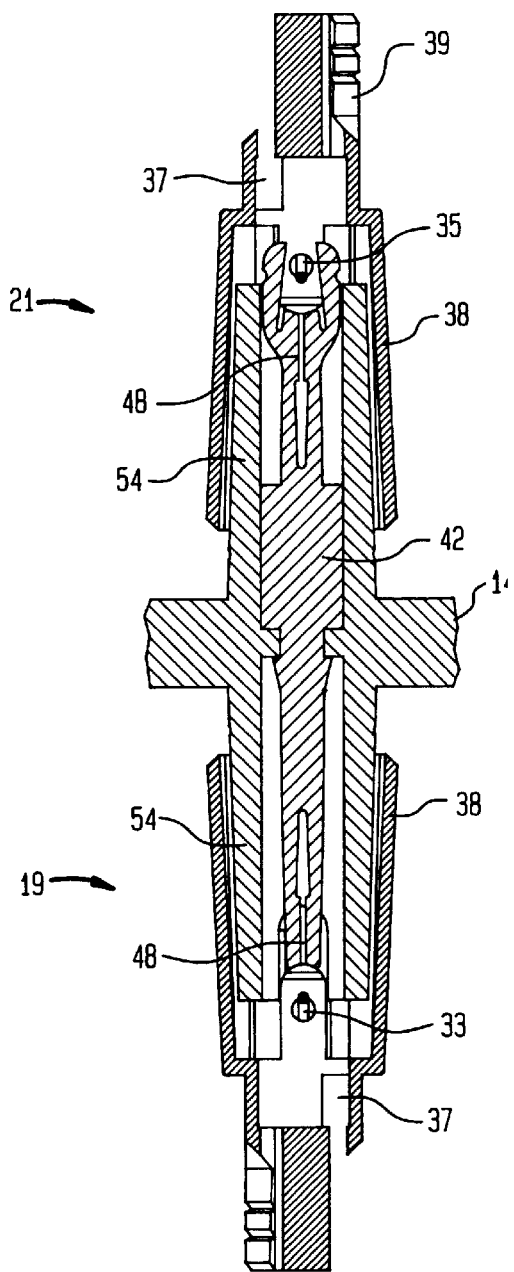
FIG. 18 is a side sectional view taken along section B—B of FIG. 17 with the respective caps of both sides of the double sided connector in a position of readiness to receive an individual conductor.
Figure 21:
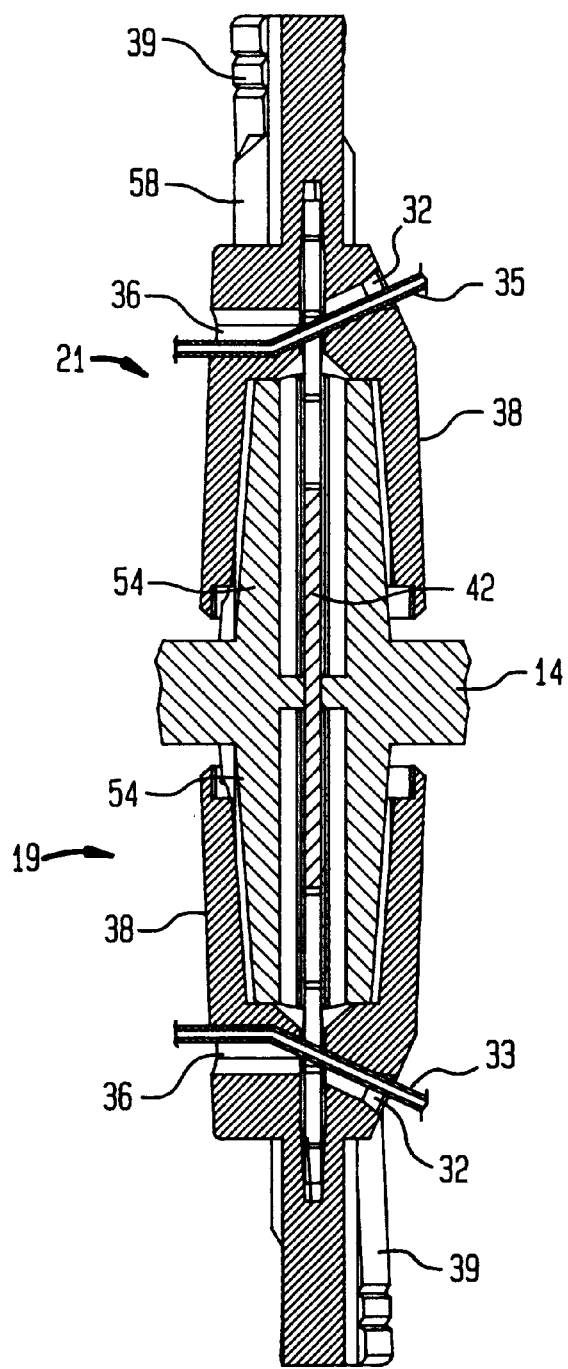
FIG. 21 is a side sectional view taken through section A—A of FIG. 17 showing the respective caps in the double sided connector in the position shown in FIG. 19.

Referring to FIGS. 18 and 19, there is depicted a sectional view of the double sided tool-less IDC connector depicted in FIG. 17, taken along section B—B. FIGS. 20 and 21 are similar sections taken along section lines A—A of FIG. 17. Referring to FIGS. 18 and 20, the upper connector 21 is shown with its cap 38 raised in its upper, open position, permitting insertion through insertion hole 32 of a single conductor 35 which may be passed through wire exit hole 36. Similarly, the lower portion of FIGS. 18 and 20 depict terminal 19 with cap 38 in the raised position with a conductor 33 inserted therein. In the raised position, no portion of terminal strip 42 protrudes through aperture 37.

With reference to FIGS. 19 and 21, the respective cross sections are shown with cap 38 pushed down upon connector base 54 whereupon, with respect to connector 21, conductor 35 is pushed into wire gripping region 48 of terminal strip 42 in a manner known in the art. Likewise, wire 33 is driven into wire gripping region 48 of connector 19, thereby forming an electrical connection between conductor 33 inserted in connector 19 and wire 35 inserted in connector 21 through metallic terminal 42. With reference to connector 21, at an end region of metallic terminal 42 there are formed test ears 46, which are exposed through test aperture 37 when cap 38 is pushed down upon base 54.

Referring now to FIGS. 14, 22 and 23, the metallic terminal 42 is shown in greater detail. As seen in FIGS. 14 and 22, metallic terminal 42 is insertable into base 14 so as to extend through respective connector bases 54 and form an electrical connection between the connector on one side of connector base 14 and its respective matching opposite connector on the other side of the base 14. Terminal strip 42 is provided with a sloped region 49 which, upon insertion downward into upwardly facing base 54 of connector block 14 extends between snap fit protrusions 56 so as to secure terminal 42 within connector block 14 through the mating engagement of snap fit protrusion 56 and snap fit recesses 44 of terminal 42. As mentioned above, test ears 46 are provided on one end of terminal strip 42 extending above wire grip region 48 to permit electrical access to metallic terminal 42 through test aperture 37 in cap 38. Test ears 46 would normally be oriented so as to be available in the third array, thereby permitting an installer, repair person or other person requiring testing ability to perform electrical tests on specific telephone lines without the need to unfold enclosure 1. This greatly simplifies testing, and assists in the localization of problems, should they occur. The opposite end 47 of terminal strip 42 contains no test ears. Thus there is no access to the terminal 42 from the lower side of base unit 54 through cap 38. However, because there may be occasion to selectively isolate the terminal 42 from access through cap 38, such as, by way of non-limiting example, for security lines and alarm lines, terminal strip 42 may be removed from base 14 by pulling on test ears 46 with fingers or pliers or other suitable tool, causing snap fit protrusions 56 to release from snap fit recesses 44 and removal of terminal strip 42 from connector block 14. The terminal strip 42 may then be reinserted from the opposite side of the base 14 so that the earless side 47 will be facing upwardly, that is on the side forming the third array 20, so as to deny access to terminal strip 42 through cap 38 without unfolding the entire enclosure 1. Thus, the double sided connector 14 further includes a flexible test feature whereby the ability to gain electrical access to terminal strip 42 may be selectively altered from one side of block 14 to the other.

There may be, however, occasions when tests ears 46 need to be accessed from both sides of connector block 14. In such instances, and with reference to FIGS. 24 and 25, the terminal strip 42 may be configured to have sloped regions 49 on both sides of snap fit recesses 44 for selective insertion through either side of connector block 44 through bases 54. Terminal 42 may then be equipped with test ears 46 on both sides, thereby permitting electrical access to terminal 42 from either side of connector block 14 through test apertures 37 in respective caps 38 on both sides of block 14.

Alternatively, there may be occasions when no test access is required or desired, whereby the configuration depicted in FIGS. 26 and 27 may be utilized. In such an instance, neither side of the IDC terminal strip 42 contains test ears 46, both ends 47 being shortened so as to not protrude through test apertures 37 in caps 38 after installation and insertion of respective electrical conductors. Insertion and removal of the terminal strip, and snap fit retention via protrusions 56 and recesses 44 is accomplished as described above in connection with the preceding terminal strip embodiments. Thus, the double sided connector block of the present invention may be provided with a variety of terminal strip options further increasing the flexibility of application and utilization of the present invention by the person of skill the art.

Terminal strip 42 may be formed of any commonly known conductive metal known in the art and suitable for use in such terminals, such as, for example, platinum washed phosphor bronze, or beryllium-cooper alloy or other metal or alloy combining good electrical conductivity with high mechanical strength and resilience. Similarly, connector block 14 is preferably formed of a molded synthetic resinous material with good insulating properties and mechanical strength, as are caps 38. The specific materials utilized in constructing connector block 14 and caps 38 are an application specific matter of design choice within the knowledge of the person of skill familiar with terminal blocks utilized in the telephony art.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

I claim:

1. A multilayer, foldable wire distribution field, comprising:
   a first wiring layer comprising a first array of pairs of connectors, each connector pair being connectable to a tip-ring pair of conductors of a telephone line to be terminated in said field;
   a second wiring layer having a first side and an oppositely facing second side and being hingeably pivotably connected to said first layer for selectably pivoting said second layer from a first folded position wherein said first side confrontingly overlies said first layer to a second unfolded position which reveals said first layer;

said first side having a second array of pairs of connectors, each second array pair being configured for receiving electrical conductors connected to a selected one first array pair; and said second side having a third array of pairs of connectors, each third array pair being electrically connected to a respective matching second array pair, so that a telephone line connected to said selected one first array pair may be connected to one or more selected third array pairs through electrical interconnection of said selected one first array pair to one or more of the respective second array pairs that match said selected third array pairs without requiring multiple connections on said first array pair.

2. The field of claim 1, wherein said first layer further comprises a splice chamber and an array of protector connectors, each protector connector being electrically connected to a respective first array pair for interposing a telephone line protection device between said splice chamber and said first array pair.

3. The field of claim 1, wherein first layer and said second layer together form a wiring enclosure that is closed when said second layer is in said first position and open when said second layer is in said second position.

4. The field of claim 3, wherein said enclosure is a network interface unit.

5. The field of claim 3, wherein said enclosure is a building entrance protector.

6. The field of claim 3, further comprising a securement device for securing said first layer and said second layer together when closed.

7. The field of claim 2, wherein said splice chamber includes apertures on opposite surfaces thereof so as to permit cables to enter and exit said chamber.

8. The field of claim 1, wherein said connectors of said first, said second and said third array pairs are chosen from a group of connectors consisting of a wire wrap terminal, a binding post, an insulation displacement connector and a tool-less insulation displacement connector.

9. The field of claim 1, wherein said second connector array and said third connector array are formed on respective opposite sides of a single connector block, and wherein said second array connectors and said third array connectors are tool-less insulation displacement type connectors.

10. The field of claim 9, wherein said electrical connection between said matching second array connectors and said third array connectors is formed via an electrically conductive terminal strip having at opposite ends thereof a wire retention region for stripping insulation from and retaining therein an electrical conductor, such that a conductor retained in said retention region at one end of said terminal strip is electromechanically connected to a conductor retained in said retention region at the opposite end of said terminal strip.

11. The field of claim 10, wherein each tool-less insulation displacement type connector comprises a base portion for retaining a portion of said terminal strip and a cap mounted over said base and slideably moveable between a first position for facilitating insertion of a conductor into said cap and a second position wherein said inserted conductor is forced by said cap into contact with, and stripped and retained by, said wire retention region of said terminal strip.

12. The field of claim 11, wherein said terminal strip further comprises at least one test ear extending beyond one respective wire retention region, and wherein said cap comprises a test aperture so sized and oriented that when said cap is in said second position at least a portion of said test ear protrudes through said test aperture.

13. The field of claim 12, wherein said terminal strip is removeably mounted in said connector block such that said test ear may be selectively oriented to be accessible through a respective cap on a selected one of said opposite sides of said connector block.

14. The field of claim 12, wherein said terminal strip comprises at least one test ear at both ends of said terminal strip.

15. The field of claim 12, further comprising cap protrusions formed on a portion of said cap adjacent said test aperture, such that when said cap is gripped by a user the user's fingers do not contact the portion of said test ear protruding through said test aperture.

16. The field of claim 1, further comprising a pair of wire guides comprising a first wire guide disposed on said first wiring layer and a second wire guide disposed on said second wiring layer, said pair of wire guides guidedly causing a wire connected between said first array and said second array to traverse a path across said hinge such that when said second wiring layer is moved into said closed position, said wire is subjected to both rotational and bending forces.

* * * * *